US007411981B1

(12) United States Patent
Reed et al.

(10) Patent No.: US 7,411,981 B1
(45) Date of Patent: *Aug. 12, 2008

(54) MATCHING OF RADIUS REQUEST AND RESPONSE PACKETS DURING HIGH TRAFFIC VOLUME

(75) Inventors: Scott K. Reed, Knoxville, TN (US); Gregory Weber, Knoxville, TN (US); Mark Eklund, Knoxville, TN (US); Robert Sargent, Knoxville, TN (US); Steven J. Rich, Knoxville, TN (US)

(73) Assignee: Cisco Technology, Inc., San Jose, CA (US)

( * ) Notice: Subject to any disclaimer, the term of this patent is extended or adjusted under 35 U.S.C. 154(b) by 858 days.

This patent is subject to a terminal disclaimer.

(21) Appl. No.: 10/874,734

(22) Filed: Jun. 22, 2004

(51) Int. Cl.
*H04J 3/26* (2006.01)
*H04L 12/22* (2006.01)

(52) U.S. Cl. ........................................ 370/475; 709/217

(58) Field of Classification Search ................. 370/475; 708/217
See application file for complete search history.

(56) References Cited

U.S. PATENT DOCUMENTS

| 4,439,763 A | 3/1984 | Limb ....................... 340/825.5 |
| 4,506,358 A | 3/1985 | Montgomery ................ 370/60 |
| 4,532,626 A | 7/1985 | Flores et al. ................... 370/85 |
| 4,769,810 A | 9/1988 | Eckberg, Jr. et al. .......... 370/60 |
| 4,769,811 A | 9/1988 | Eckberg, Jr. et al. .......... 370/60 |
| 4,922,486 A | 5/1990 | Lidinski et al. ............... 370/60 |
| 5,014,265 A | 5/1991 | Hahne et al. .................. 370/60 |
| 5,241,594 A | 8/1993 | Kung ............................ 380/4 |
| 5,280,470 A | 1/1994 | Buhrke et al. ................. 370/13 |
| 5,303,237 A | 4/1994 | Bergman et al. ........... 370/85.6 |
| 5,313,454 A | 5/1994 | Bustini et al. ................. 370/13 |
| 5,359,592 A | 10/1994 | Corbalis et al. ............... 370/17 |
| 5,430,715 A | 7/1995 | Corbalis et al. ............... 370/54 |
| 5,473,607 A | 12/1995 | Hausman et al. ......... 370/85.13 |

(Continued)

FOREIGN PATENT DOCUMENTS

WO  99/53408  10/1999

OTHER PUBLICATIONS

Carrel, D. et al. The TACACS+ Protocol, Version 1.78, Cisco Systems, Inc., printed from ftp://ftp-eng.cisco.com/gdweber/tac-rfc.1.78.txt on Oct. 23, 2000.

(Continued)

*Primary Examiner*—Melvin Marcelo
(74) *Attorney, Agent, or Firm*—Thelen Reid Brown Raysman & Steiner LLP; David B. Ritchie

(57) ABSTRACT

A solution for matching RADIUS request packets with corresponding RADIUS response packets when the number of simultaneous outstanding requests is greater than 256 involves using a sixteen-octet authenticator field in each packet. For each response packet that arrives, the identifier of the packet is compared in turn with the identifier of each outstanding request packet. If the identifiers match, the authenticators are then compared. If the results of the comparison indicate a match, the packet is accepted and no further processing of the outstanding requests is required. Otherwise, a search of the outstanding request packets is continued. This solution allows for more than 256 simultaneous outstanding RADIUS requests and only encounters a mismatch or ambiguous match with a probability of one in $3.4 \times 10^{38}$ packets.

17 Claims, 2 Drawing Sheets

U.S. PATENT DOCUMENTS

| | | | |
|---|---|---|---|
| 5,485,455 A | 1/1996 | Dobbins et al. | 370/60 |
| 5,655,077 A | 8/1997 | Jones et al. | 395/187.01 |
| 5,671,354 A | 9/1997 | Ito et al. | 395/187.01 |
| 5,684,950 A | 11/1997 | Dare et al. | 395/187.01 |
| 5,715,394 A | 2/1998 | Jabs | 395/200.11 |
| 5,802,047 A | 9/1998 | Kinoshita | 370/359 |
| 5,812,529 A | 9/1998 | Czarnik et al. | 370/245 |
| 5,815,665 A | 9/1998 | Teper et al. | 395/200.59 |
| 5,835,727 A | 11/1998 | Wong et al. | 395/200.68 |
| 5,898,780 A | 4/1999 | Liu et al. | 380/25 |
| 5,922,051 A | 7/1999 | Sidey | 709/223 |
| 5,944,824 A | 8/1999 | He | 713/201 |
| 5,987,232 A | 11/1999 | Tabuki | 395/187.01 |
| 5,991,810 A | 11/1999 | Shapiro et al. | 709/229 |
| 6,006,334 A | 12/1999 | Nguyen et al. | 713/202 |
| 6,011,910 A | 1/2000 | Chau et al. | 395/200.59 |
| 6,021,496 A | 2/2000 | Dutcher et al. | 713/202 |
| 6,047,376 A | 4/2000 | Hosoe | 713/201 |
| 6,092,196 A | 7/2000 | Reiche | 713/200 |
| 6,119,160 A | 9/2000 | Zhang et al. | 709/224 |
| 6,141,687 A | 10/2000 | Blair | 709/225 |
| 6,771,665 B1 * | 8/2004 | Reed et al. | 370/475 |
| 2002/0012339 A1 | 1/2002 | Wenzel et al. | 370/352 |
| 2002/0026573 A1 | 2/2002 | Park | 713/155 |

OTHER PUBLICATIONS

Rigney, et al., "Remote Authentication Dial In User Service (RADIUS)", Apr. 1997, Network Working Group, RFC 2138.

* cited by examiner

MATCHING OF RADIUS REQUEST AND RESPONSE PACKETS DURING HIGH TRAFFIC VOLUME

CROSS-REFERENCE TO RELATED APPLICATION

This application claims priority based on parent application Ser. No. 09/652,762, entitled "IMPROVED MATCHING OF RADIUS REQUEST AND RESPONSE PACKETS DURING HIGH TRAFFIC VOLUME" by Scott Reed, Gregory Weber, Mark Eklund, Robert Sargent and Steven Rich, filed on Aug. 31, 2000.

BACKGROUND OF THE INVENTION

1. Field of the Invention

The present invention relates to the field of network communications. More specifically, the present invention relates to matching of RADIUS request packets with corresponding RADIUS response packets.

2. The Background

Remote Authentication Dial In User Service (RADIUS) is a protocol for carrying authentication, authorization, and configuration information between a Network Access Server (NAS) and a shared Authentication Server in a computer network. Once a client is configured to use RADIUS, users of the client may present authentication data to the client, such as by using a username and password prompt. When the client has received the authentication data, it may desire to authenticate using RADIUS. In doing so, it must create a RADIUS "Access-Request" packet containing the authentication data and additional information, such as the port ID the user is accessing.

The RADIUS "Access-Request" Packet may then be transmitted over the network to a RADIUS server, which validates the sending client. If the client is valid, the RADIUS server consults a user database to find the user whose name matches the request. A corresponding record in the database contains information regarding how much access the user may have and what requirements must be fulfilled before access is granted. The RADIUS server may then compare the authentication data received via the RADIUS "access-request" packet with this record to determine if the user is authenticated. It may then send an "Access-Accept", "Access-Reject", or "Access-Challenge" response packet back to the client. A similar process may be invoked for accounting requests.

The RADIUS protocol provides for a one-octet identifier in request and response packets. A value is assigned to the identifier when an "access-request" packet is sent. The RADIUS server then takes this identifier and copies it into whatever response packet is sent, ensuring that corresponding request and response packets have the same identifier and thus may be matched up by the client when the response packet is received.

However, when traffic is heavy, it is possible to have more than two hundred and fifty-six outstanding simultaneous request packets from a single client. Since a one-octet identifier only allows for two hundred and fifty-six unique identifiers, this creates a problem when traffic is heavy.

One solution is to alter the User Datagram Protocol (UDP) source port used for the packets when more than two hundred and fifty-six RADIUS request packets are outstanding. The client may then match both the UDP port and the identifier to correspond RADIUS requests and response packets. Unfortunately, many companies have designed their network hardware to utilize a fixed UDP port. Furthermore, these different companies often use different fixed ports. Thus, using the UDP port as a solution is not effective.

What is needed is a solution which provides for matching RADIUS request packets with corresponding RADIUS response packets when traffic is heavy enough to require more than two hundred and fifty-six simultaneous outstanding RADIUS request packets.

SUMMARY OF THE INVENTION

A solution for matching RADIUS request packets with corresponding RADIUS response packets when the number of simultaneous outstanding requests is greater than 256 involves using a sixteen-octet authenticator field in each packet. For each response packet that arrives, the identifier of the packet is compared in turn with the identifier of each outstanding request packet. If the identifiers match, the authenticators are then compared. If the results of the comparison indicate a match, the packet is accepted and no further processing of the outstanding requests is required. Otherwise, a search of the outstanding request packets is continued. This solution allows for more than 256 simultaneous outstanding RADIUS requests and only encounters a mismatch or ambiguous match with a probability of one in $3.4 \times 10^{38}$ packets.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control and/or using a program storage device, and that modification of the general purpose computer to implement the components, process steps, and/or data structures described herein would not require undue invention.

In accordance with a specific embodiment of the present invention, the components, process steps, and/or data structures are implemented using software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

The present invention utilizes an MD5 authenticator, described below, in RADIUS packets to match RADIUS response packets to corresponding RADIUS request packets when more than one outstanding RADIUS request packet is received with the same identifier.

Figure 1:
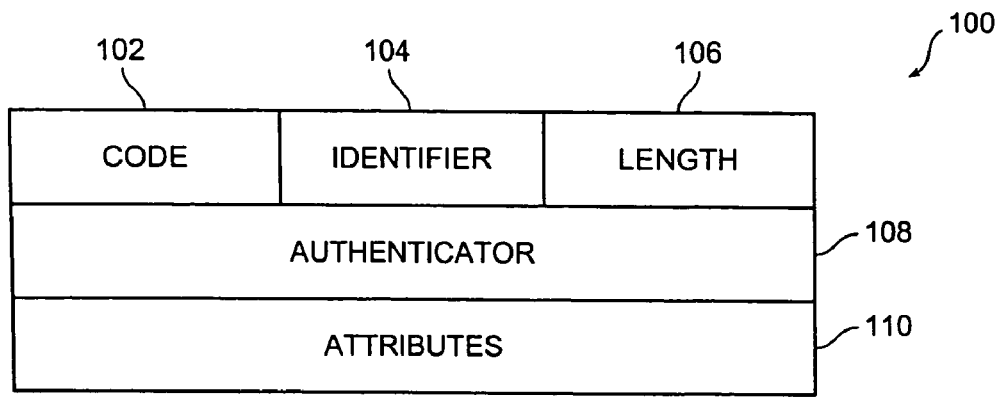
FIG. 1 is a diagram illustrating a RADIUS packet in accordance with a specific embodiment of the present invention.

FIG. 1 is a diagram illustrating a RADIUS packet in accordance with a specific embodiment of the present invention. The packet 100 contains a code field 102, which identifies the type of the RADIUS packet. Codes are currently assigned according to Table 1 below.

TABLE 1

| | |
|---|---|
| 1. | Access-Request (Request) |
| 2. | Access-Accept (Response) |
| 3. | Access-Reject (Response) |
| 4. | Accounting-Request (Request) |
| 5. | Accounting-Response (Response) |
| 11. | Access-Challenge (Response) |
| 12. | Status-Server (experimental) |
| 13. | Status-Client (experimental) |
| 255. | Reserved |

An identifier field 104 is a one-octet field that aids in matching requests and replies. A length field 106 is a two-octet field which indicates the length of the packet, inclusive of the code, identifier, length, authenticator, and attribute fields. The authenticator field 108 is either a 16 octet random number (for Access requests) or a 16 octet MD5 digest of data (for Accounting requests) used as a seed for a random number generator utilized for security verification of packets. An attributes field 110 includes other attributes defined by the RADIUS protocol.

The chances of two 16-byte random numbers being the same are 1 in $2^{128}$ or 1 in $3.4 \times 10^{38}$. Thus, it is useful to use the authenticator field 108 as a sub-identifier, or a "tie-breaker" to differentiate between two response packets with identical identifiers.

Figure 2:
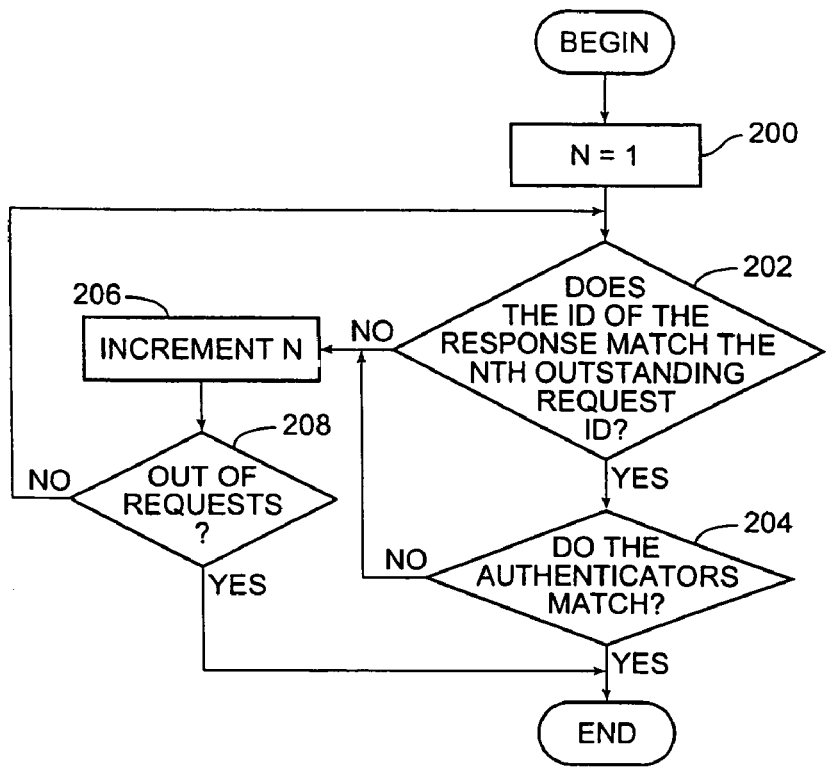
FIG. 2 is a flow diagram illustrating a method for matching a RADIUS response and packet with a corresponding RADIUS request packet from one or more outstanding RADIUS request packets, the packets all having identifier fields and authenticator fields in accordance with a specific embodiment of the present invention.

FIG. 2 is a flow diagram illustrating a method for matching a RADIUS response and packet with a corresponding RADIUS request packet from one or more outstanding RADIUS request packets, the packets all having identifier fields and authenticator fields in accordance with a specific embodiment of the present invention. At 200, a variable N is set to a value of 1. The variable N controls which outstanding request packet in a queue is being examined at any particular time, beginning with 1, indicating the first request packet in the queue. Then, at 202, it is determined if the identifier field of the nth request packet matches the identifier field of the RADIUS response packet. This may include examining the identifier fields of the RADIUS response packet and the nth of the one or more RADIUS request packets and comparing the identifier fields of the RADIUS response packet and the nth of the one or more RADIUS request packets to establish whether any are identical. If there is a match, the process moves to 204, where it is determined if the authenticator field of the nth request packet matches the authenticator field of the RADIUS response packet. This may include examining the authenticator fields of the RADIUS response packet and the nth of the one or more RADIUS request packets and comparing the authenticator fields of the RADIUS response packet and the nth of the one or more RADIUS request packets to establish whether any are identical. If a match has been found, the process may end. If either the identifier field or the authenticator field doesn't match, then the process moves to 206, where N is incremented. At 208, it is determined if there are any more requests in the queue. If not, the process ends. Otherwise, the process returns to 202 with the incremented N to examine the next packet.

Figure 3:
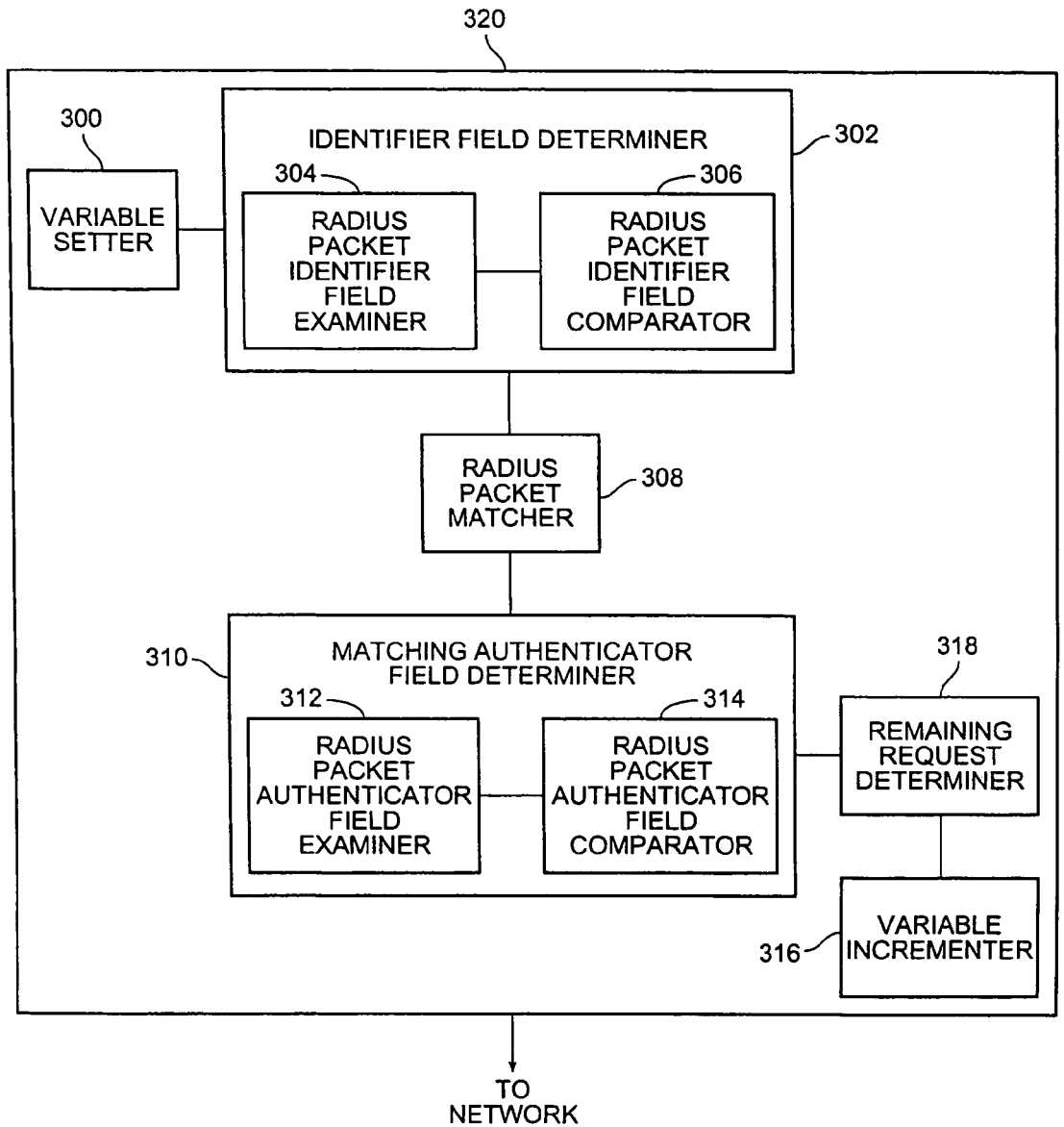
FIG. 3 is a block diagram illustrating an apparatus for matching a RADIUS response and packet with a corresponding RADIUS request packet from one or more outstanding RADIUS request packets, the packets all having identifier fields and authenticator fields in accordance with a specific embodiment of the present invention.

FIG. 3 is a block diagram illustrating an apparatus for matching a RADIUS response and packet with a corresponding RADIUS request packet from one or more outstanding RADIUS request packets, the packets all having identifier fields and authenticator fields in accordance with a specific embodiment of the present invention. A variable setter 300 sets a variable N to an initial value of 1. The variable N controls which outstanding request packet in a queue is being examined at any particular time, beginning with 1, indicating the first request packet in the queue. An identifier field determiner 302 determines if the identifier field of the nth request packet matches the identifier field of the RADIUS response packet. This may include using a RADIUS packet identifier field examiner 304 to examine the identifier fields of the RADIUS response packet and the nth of the one or more RADIUS request packets and a RADIUS packet identifier field comparator 306 coupled to the RADIUS packet identifier field examiner 302 to comparing the identifier fields of the RADIUS response packet and the nth of the one or more RADIUS request packets to establish whether any are identical.

If there is a match, a matching authenticator field determiner 308 coupled to the RADIUS packet identifier field comparator 306 determines if the authenticator field of the nth request packet matches the authenticator field of the RADIUS response packet. This may include using a RADIUS packet authenticator field examiner 310 to examine the authenticator fields of the RADIUS response packet and the nth of the one or more RADIUS request packets and a RADIUS packet authenticator field comparator 312 coupled to the RADIUS packet authenticator field examiner 310 to compare the authenticator fields of the RADIUS response packet and the nth of the one or more RADIUS request packets to establish whether any are identical. If both the authenticator fields and identifier fields match, a RADIUS packet matcher 314 may then match the RADIUS response packet with the nth of the one or more RADIUS request packets.

If either the identifier field or the authenticator field doesn't match, then a variable incrementer 316 increments N. A remaining response determiner 318 coupled to the variable incrementer 316 determines if there are any more responses in the queue. If not, the process ends. Otherwise, the process returns to the identifier field determiner 302 with the incremented N to examine the next packet. The present invention may be located in a network device designed to process packets, such as a router or gateway 320 connected to a network.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for matching a RADIUS response packet with a corresponding RADIUS request packet from one or more RADIUS request packets, the packets all having identifier fields and authenticator fields, including:

comparing the identifier field of the RADIUS response packet to the identifier field of one of the RADIUS request packets;

comparing the authenticator field of the RADIUS response packet to the authenticator field of said one of the RADIUS request packets, if the identifier field of the RADIUS response packet and the identifier field of said one of the RADIUS request packets match; and repeating said comparing the identifier field and said comparing the authenticator field with an uncompared RADIUS request packet, if either the identifier field of the RADIUS response packet and the identifier field of said one of the RADIUS request packets don't match, or the authenticator field of the RADIUS response packet and the authenticator field of said one of the RADIUS request packets don't match.

2. The method of claim 1, wherein the authenticator field is a random number if the RADIUS request packet is an access request.

3. The method of claim 1, wherein the authenticator field is an MD5 digest used as a seed for a random number if the RADIUS request packet is an accounting request.

4. A method for matching an access response packet with a corresponding access request packet from one or more access request packets, the packets all having identifier fields and authenticator fields, including:

comparing the identifier field of the access response packet to the identifier field of one of the access request packets;

comparing the authenticator field of the access response packet to the authenticator field of said one of the access request packets, if the identifier field of the access response packet and the identifier field of said one of the access request packets match; and repeating said comparing the identifier field and said comparing the authenticator field with an uncompared access request packet, if either the identifier field of the access response packet and the identifier field of said one of the access request packets don't match, or the authenticator field of the access response packet and the authenticator field of said one of the access request packets don't match.

5. The method of claim 4, wherein the authenticator field is a random number.

6. A method for matching an accounting response packet with a corresponding accounting request packet from one or more accounting request packets, the packets all having identifier fields and authenticator fields, including:

comparing the identifier field of the accounting response packet to the identifier field of one of the accounting request packets;

comparing the authenticator field of the accounting response packet to the authenticator field of said one of the accounting request packets, if the identifier field of the accounting response packet and the identifier field of said one of the accounting request packets match; and repeating said comparing the identifier field and said comparing the authenticator field with an uncompared accounting request packet, if either the identifier field of the accounting response packet and the identifier field of said one of the accounting request packets don't match, or the authenticator field of the accounting response packet and the authenticator field of said one of the accounting request packets don't match.

7. The method of claim 6, wherein the authenticator field is an MD5 digest used as a seed for a random number.

8. An apparatus for matching a RADIUS response packet with a corresponding RADIUS request packet from one or more RADIUS request packets, the packets all having identifier fields and authenticator fields, the apparatus including:

means for comparing the identifier field of the RADIUS response packet to the identifier field of one of the RADIUS request packets;

means for comparing the authenticator field of the RADIUS response packet to the authenticator field of said one of the RADIUS request packets, if the identifier field of the RADIUS response packet and the identifier field of said one of the RADIUS request packets match; and means for repeating said comparing the identifier field and said comparing the authenticator field with an uncompared RADIUS request packet, if either the identifier field of the RADIUS response packet and the identifier field of said one of the RADIUS request packets don't match, or the authenticator field of the RADIUS response packet and the authenticator field of said one of the RADIUS request packets don't match.

9. The apparatus of claim 8, wherein the authenticator field is a random number if the RADIUS request packet is an access request.

10. The apparatus of claim 8, wherein the authenticator field is an MD5 digest used as a seed for a random number if the RADIUS request packet is an accounting request.

11. An apparatus for matching an access response packet with a corresponding access request packet from one or more access request packets, the packets all having identifier fields and authenticator fields, the apparatus including:

means for comparing the identifier field of the access response packet to the identifier field of one of the access request packets;

means for comparing the authenticator field of the access response packet to the authenticator field of said one of the access request packets, if the identifier field of the access response packet and the identifier field of said one of the access request packets match; and means for repeating said comparing the identifier field and said comparing the authenticator field with an uncompared access request packet, if either the identifier field of the access response packet and the identifier field of said one of the access request packets don't match, or the authenticator field of the access response packet and the authenticator field of said one of the access request packets don't match.

12. The apparatus of claim 11, wherein the authenticator field is a random number.

13. An apparatus for matching an accounting response packet with a corresponding accounting request packet from one or more accounting request packets, the packets all having identifier fields and authenticator fields, the apparatus including:

means for comparing the identifier field of the accounting response packet to the identifier field of one of the accounting request packets;

means for comparing the authenticator field of the accounting response packet to the authenticator field of said one of the accounting request packets, if the identifier field of the accounting response packet and the identifier field of said one of the accounting request packets match; and means for repeating said comparing the identifier field and said comparing the authenticator field with an uncompared accounting request packet, if either the identifier field of the accounting response packet and the identifier field of said one of the accounting request packets don't match, or the authenticator field of the accounting response packet and the authenticator field of said one of the accounting request packets don't match.

14. The apparatus of claim 13, wherein the authenticator field is an MD15 digest used as a seed for a random number.

15. A program storage device readable by a machine, tangibly embodying a program of instructions executable by the machine for matching a RADIUS response packet with a corresponding RADIUS request packet from one or more RADIUS request packets, the packets all having identifier fields and authenticator fields, the method including:
 comparing the identifier field of the RADIUS response packet to the identifier field of one of the RADIUS request packets;
 comparing the authenticator field of the RADIUS response packet to the authenticator field of said one of the RADIUS request packets, if the identifier field of the RADIUS response packet and the identifier field of said one of the RADIUS request packets match; and
 repeating said comparing the identifier field and said comparing the authenticator field with an uncompared RADIUS request packet, if either the identifier field of the RADIUS response packet and the identifier field of said one of the RADIUS request packets don't match, or the authenticator field of the RADIUS response packet and the authenticator field of said one of the RADIUS request packets don't match.

16. A program storage device readable by a machine, tangibly embodying a program of instructions executable by the machine for matching an access response packet with a corresponding access request packet from one or more access request packets, the packets all having identifier fields and authenticator fields, and a variable n initially set to 1, the method including:
 comparing the identifier field of the access response packet to the identifier field of one of the access request packets;
 comparing the authenticator field of the access response packet to the authenticator field of said one of the access request packets, if the identifier field of the access response packet and the identifier field of said one of the access request packets match; and
 repeating said comparing the identifier field and said comparing the authenticator field with an uncompared access request packet, if either the identifier field of the access response packet and the identifier field of said one of the access request packets don't match, or the authenticator field of the access response packet and the authenticator field of said one of the access request packets don't match.

17. A program storage device readable by a machine, tangibly embodying a program of instructions executable by the machine for matching an accounting response packet with a corresponding accounting request packet from one or more accounting request packets, the packets all having identifier fields and authenticator fields, the method including:
 comparing the identifier field of the accounting response packet to the identifier field of one of the accounting request packets;
 comparing the authenticator field of the accounting response packet to the authenticator field of said one of the accounting request packets, if the identifier field of the accounting response packet and the identifier field of said one of the accounting request packets match; and
 repeating said comparing the identifier field and said comparing the authenticator field with an uncompared accounting request packet, if either the identifier field of the accounting response packet and the identifier field of said one of the accounting request packets don't match, or the authenticator field of the accounting response packet and the authenticator field of said one of the accounting request packets don't match.

* * * * *

UNITED STATES PATENT AND TRADEMARK OFFICE
CERTIFICATE OF CORRECTION

| | | |
|---|---|---|
| PATENT NO. | : 7,411,981 B1 | Page 1 of 1 |
| APPLICATION NO. | : 10/874734 | |
| DATED | : June 22, 2004 | |
| INVENTOR(S) | : Scott K. Reed et al. | |

It is certified that error appears in the above-identified patent and that said Letters Patent is hereby corrected as shown below:

Title Page

Insert the following below "(22) Filed: Jun. 22, 2004"

--Related U.S. Application Data

(63) Continuation of Application No. 09/652,762, filed on August 31, 2000, now Pat. No. U.S. 6,771,665.--

Signed and Sealed this

Fourteenth Day of September, 2010

David J. Kappos
*Director of the United States Patent and Trademark Office*